(12) United States Patent
Skriba et al.

(10) Patent No.: US 12,535,405 B2
(45) Date of Patent: Jan. 27, 2026

(54) IMMERSION, FLOW OR ADD-ON MEASURING SYSTEM IN ANALYTICAL PROCESS TECHNOLOGY

(71) Applicant: Endress+Hauser Optical Analysis, Inc., Ann Arbor, MI (US)

(72) Inventors: Nicholas Skriba, Jackson, MI (US); Marc Winter, Gelnhausen (DE)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 110 days.

(21) Appl. No.: 18/642,521

(22) Filed: Apr. 22, 2024

(65) Prior Publication Data
US 2025/0327736 A1     Oct. 23, 2025

(51) Int. Cl.
  *G01J 3/44*    (2006.01)
  *G01N 21/15*   (2006.01)
  *G01N 21/65*   (2006.01)
  *G01N 21/01*   (2006.01)

(52) U.S. Cl.
  CPC .............. *G01N 21/15* (2013.01); *G01N 21/65* (2013.01); *G01N 2021/0106* (2013.01)

(58) Field of Classification Search
  CPC ...... G01D 11/24; G01D 11/245; G01F 15/14; G01N 21/15; G01N 21/65; G01J 3/44
  See application file for complete search history.

(56) References Cited

U.S. PATENT DOCUMENTS

| | | | |
|---|---|---|---|
| 2014/0298901 A1 | 10/2014 | Wunderlich et al. | |
| 2017/0268910 A1 | 9/2017 | Schneider et al. | |
| 2020/0348173 A1 | 11/2020 | Norwood | |
| 2021/0190553 A1 * | 6/2021 | Wilhelm | G01N 27/283 |
| 2021/0190642 A1 | 6/2021 | Pfauch et al. | |

FOREIGN PATENT DOCUMENTS

| | | | | |
|---|---|---|---|---|
| DE | 102013103459 A1 * | 10/2014 | ............ | C12M 39/00 |
| DE | 102014101759 A1 * | 8/2015 | ............ | G01N 27/38 |
| DE | 102019118156 A1 * | 1/2021 | ............ | G01D 11/245 |
| DE | 102016111111 B4 * | 2/2021 | ............ | G01D 11/24 |
| DE | 102019135589 A1 * | 6/2021 | ............ | G01N 21/55 |

* cited by examiner

*Primary Examiner* — Abdullahi Nur
(74) *Attorney, Agent, or Firm* — Christopher R. Powers; Endress+Hauser (USA) Holding, Inc.

(57) ABSTRACT

A measuring system includes: an optical sensor for measuring a variable of a medium in a process vessel; a retractable fitting for mounting the optical sensor, including a hollow cylindrical housing with a housing wall, which includes a service chamber within the housing, and an immersion tube, which is axially movable within the housing between a service position, in which the immersion tube is withdrawn from the medium, and a process position, in which the immersion tube is in the medium, wherein the optical sensor is disposed in the immersion tube, and wherein the housing wall includes an opening adjacent the service chamber; and a calibration unit movably mounted in the opening between a rest position and a calibration position, wherein the calibration unit is outside the service chamber in the rest position, and wherein the calibration unit is in optical contact with the optical sensor in the calibration position.

12 Claims, 3 Drawing Sheets

IMMERSION, FLOW OR ADD-ON MEASURING SYSTEM IN ANALYTICAL PROCESS TECHNOLOGY

TECHNICAL FIELD

The present disclosure relates to an immersion, flow or add-on measuring system in analytical process technology, in particular, including an optical sensor in a retractable fitting.

BACKGROUND

Sensors must be regularly calibrated and, if necessary, adjusted and verified. This also applies to optical sensors, for example, spectroscopic sensors, in particular, Raman spectroscopic sensors. These are also known as Raman analyzers.

During the lifetime of a Raman analyzer, there will be a need to recalibrate or verify the entire analysis system, whether due to replacement of parts or due to customer procedures or regulations. If the analyzer system uses in situ probes, the probe must be removed from the process, which can lead to process shutdowns, additional cleaning/contamination protocols, etc. This removal usually requires either the shutdown of the entire process or at least the shutdown of a bypass where the probe may be installed. Consequently, there is a need to minimize, and preferably eliminate, non-productive time. In the past, the removal process was performed manually, which is error-prone and time consuming. Once the probe is reinstalled, the process integrity must be restored. Calibration/verification is therefore a time-consuming process.

SUMMARY

The present disclosure aims to provide a simple way to calibrate optical sensors without having to stop the process in which the sensors are used.

In one aspect, an immersion, flow or add-on measuring system in analytical process technology comprises an optical sensor which is designed to measure at least one variable of a medium in a vessel; a retractable fitting for mounting the optical sensor, comprising a substantially hollow cylindrical housing with a housing wall, a service chamber formed in the interior in a region of the housing, and an immersion tube which is axially translatable in the housing between a service position, in which the immersion tube is translated out of the medium, and a process position, in which the immersion tube is translated into the medium, wherein the immersion tube is positioned at least partially in the service chamber in the service position, wherein the optical sensor is disposed in the immersion tube, wherein an opening is disposed in the housing wall in the vicinity of the service chamber; and a calibration unit, which is movably mounted in the opening between a rest position and a calibration position, the calibration unit being arranged outside the service chamber in the rest position, wherein, in the calibration position, the calibration unit is in optical contact with the optical sensor with the retractable fitting in the service position, in particular, the calibration unit is arranged at least partially within the service chamber.

The present disclosure enables the removal of the probe from the process, by providing a system that, while removing the probe from the process, maintains the process integrity intact. The system according to the present disclosure provides means to insert a calibration means and/or a light source for calibration into the light path of the optical sensor. The system enables a fully automated calibration and verification procedure with optional automated cleaning for Raman probes. This reduces shutdown times, effort and resource usage, saving the user significant amounts of time and money.

In another aspect, the retractable fitting comprises one or more seals in the region of the opening, which seal the environment with respect to the service chamber.

In another aspect, the retractable fitting is configured such that, in the process position, the calibration unit cannot be moved into the calibration position.

In another aspect, the retractable fitting is configured such that, in the calibration position of the calibration unit, the retractable fitting is not movable into the process position.

In another aspect, the calibration unit comprises at least one light source, which emits light in the direction of the optical sensor in the calibration position.

In another aspect, the calibration unit comprises at least one reference material by which the optical sensor is calibrated.

In another aspect, the retractable fitting comprises at least one flushing connection, preferably two flushing connections, to the service chamber.

In another aspect, the optical sensor is configured as a spectroscopic sensor, for example, as a Raman spectroscopic sensor.

In another aspect, the measuring system comprises a data processing unit, which controls the translation of the immersion tube between the process position and the service position, the translation of the calibration unit between the rest position and the calibration position, and a calibration procedure of the optical sensor using the calibration unit.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

Figure 1:
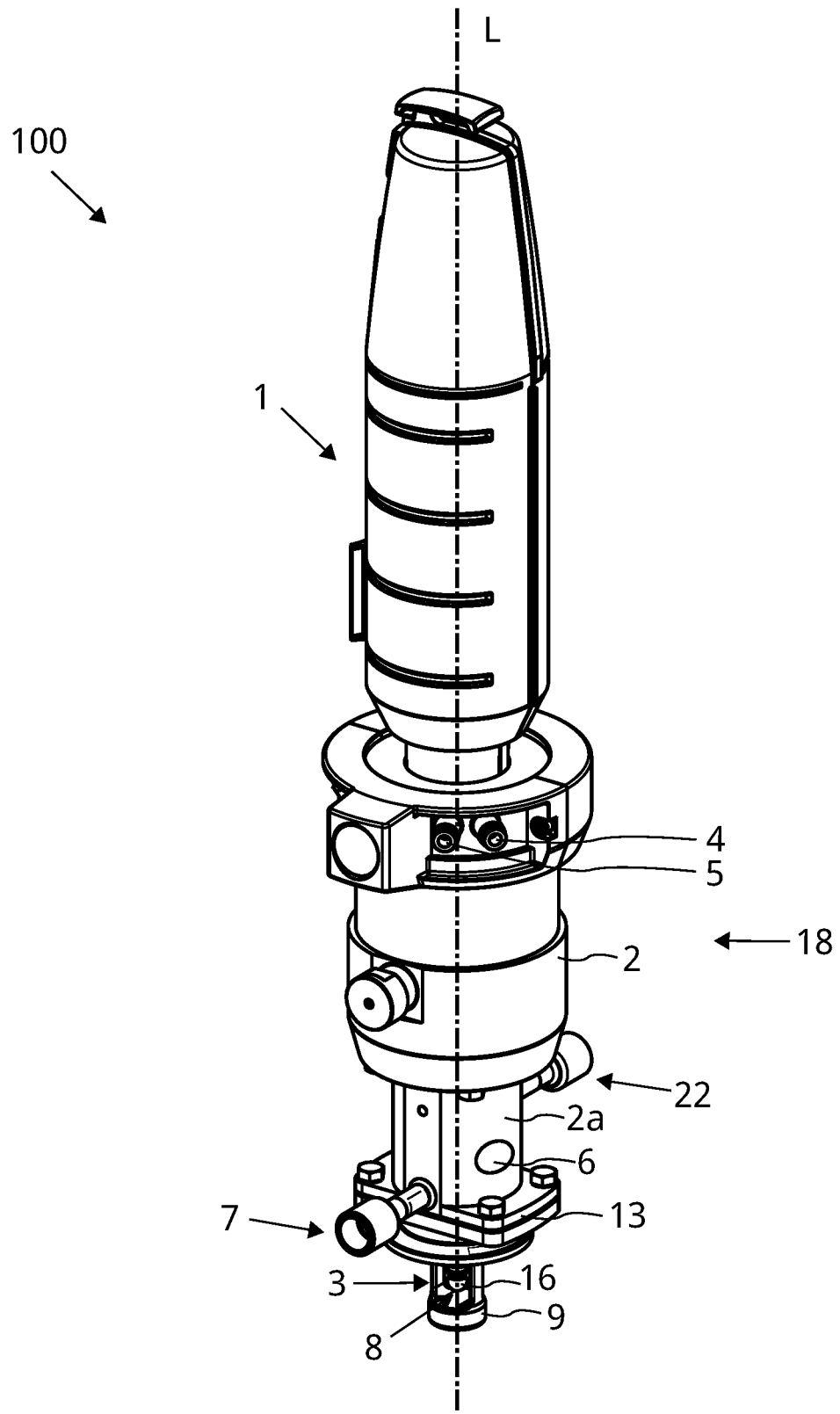
FIG. 1 shows a perspective view of a measuring system with a retractable fitting according to the present disclosure.

In the figures, identical features are marked with identical reference signs.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 2:
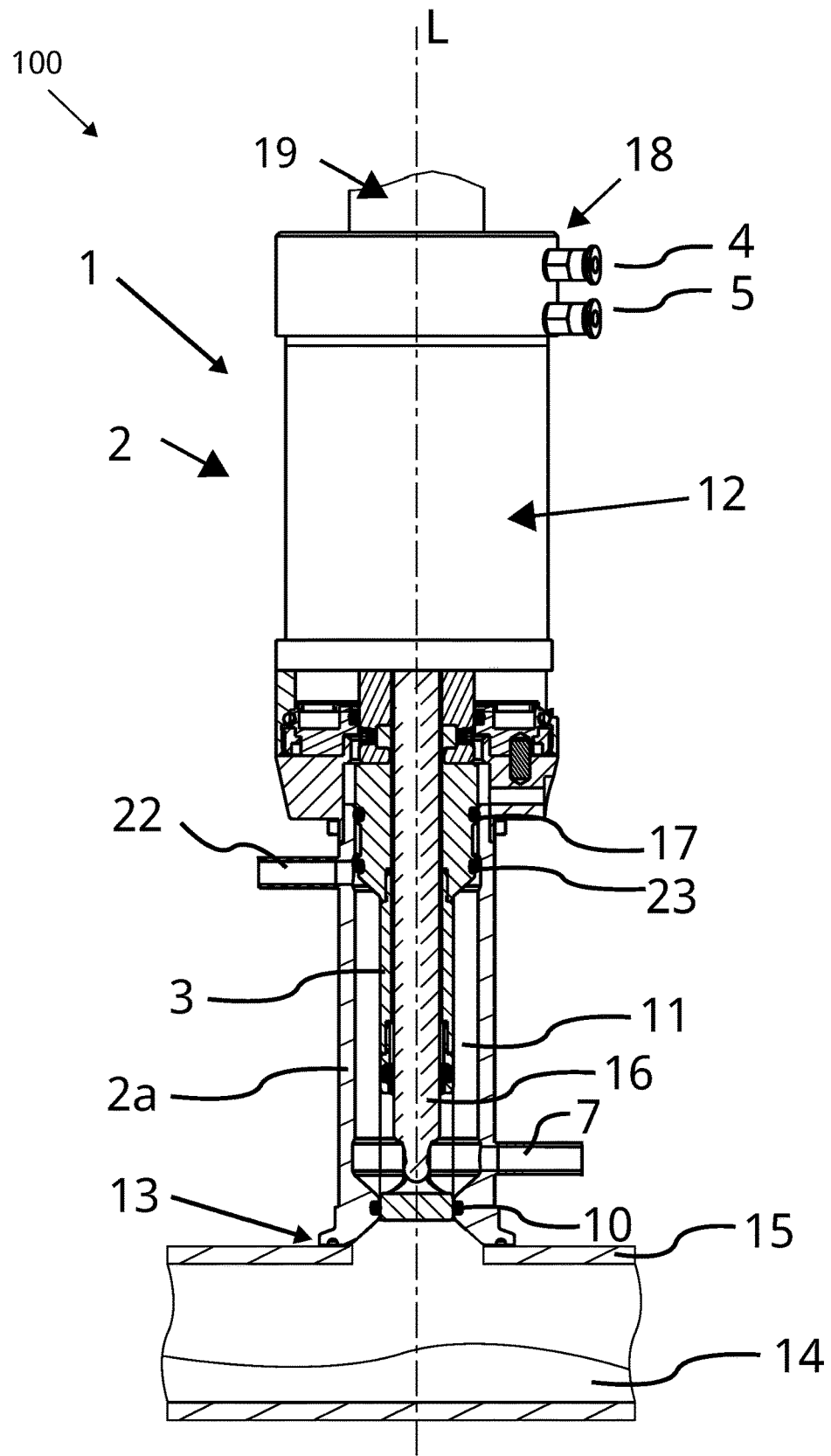
FIG. 2 shows a partial cross-sectional view of measuring system with the retractable fitting of FIG. 1.
Figure 3:
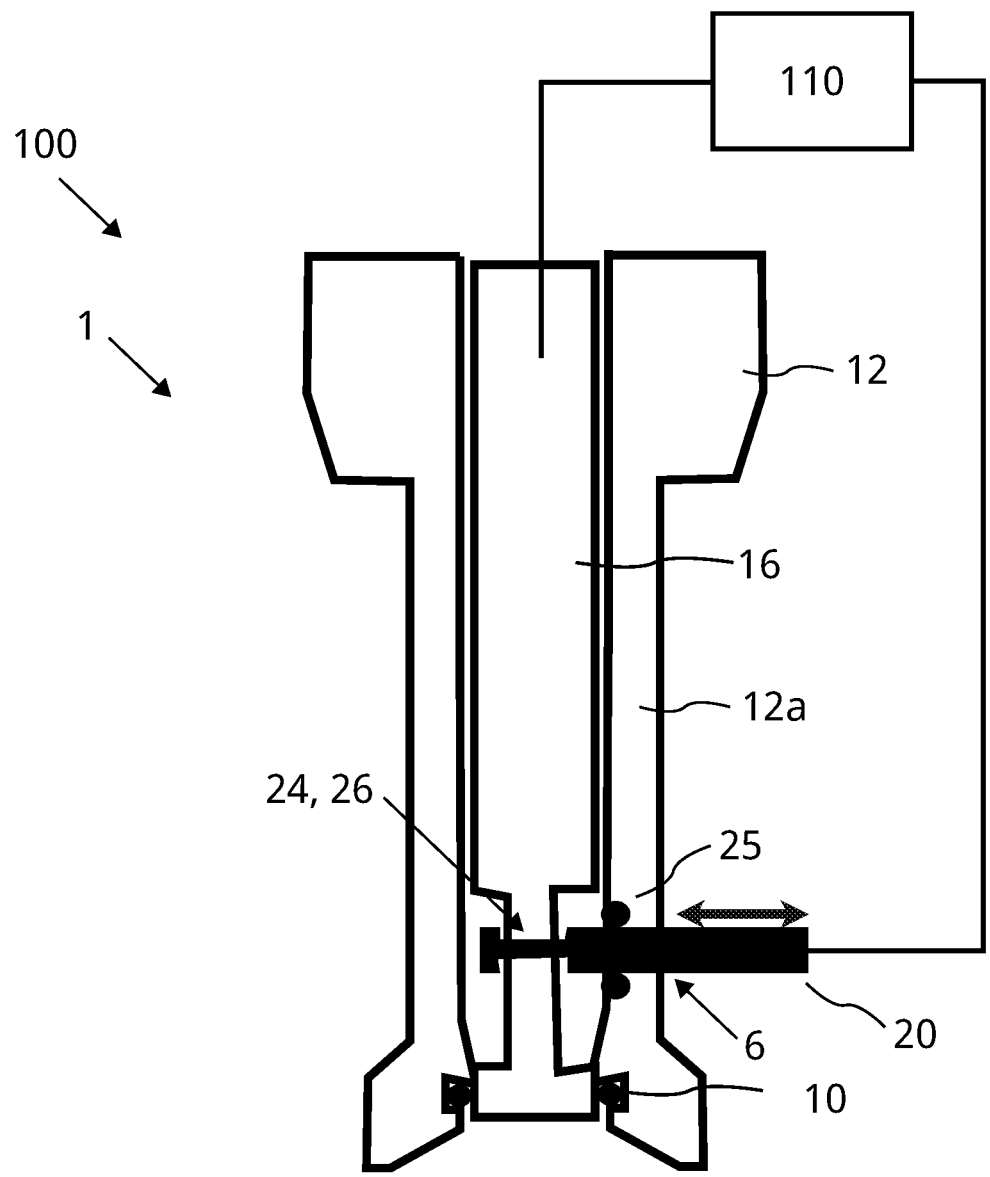
FIG. 3 shows a cross-sectional view of a portion of the retractable fitting adjacent the medium.

According to the present disclosure, a measuring system 100 comprises a retractable fitting 1, an optical sensor 16, and a calibration unit 20. FIG. 1 shows the measuring system 100 with the retractable fitting 1; in FIG. 2, the sensor 16 with the retractable fitting 1 is shown in cross-section; and the calibration unit 20 is shown in FIG. 3.

The sensor 16 is disposed in the retractable fitting 1. The sensor 16 is operable to measure one or more physical, chemical, or biological parameters of a measuring medium 14. The sensor 16 is a spectroscopic sensor, for example, configured as a Raman spectroscopic sensor.

In the context of the present disclosure, "top", "above", and related terms mean a direction facing away from the measurement medium 14. "Bottom", "below", and related terms mean a direction facing the medium 14 for the purposes of the present disclosure.

The retractable fitting in its entirety is indicated by the reference sign 1. The retractable fitting 1 comprises an essentially cylindrical housing 2, which can be connected to a process container 15 via a connection means 13. The housing 2 is defined by the housing wall 2a. Connection means 13 may be, e.g., a flange connection, e.g., made of stainless steel. However, other configurations and structures are possible. The measuring medium 14 to be measured is in the process container 15. The process container 15 can be a vessel, tank, pipe, pipeline or similar.

FIG. 1 shows the retractable fitting 1 in the process position; FIG. 2 shows the retractable fitting 1 in the service position, as described in greater detail herein.

An immersion tube 3 is translatable and guided inside the housing 2. An optical sensor 16 is disposed inside the immersion tube 3. The sensor 16 is connected to the immersion tube 3, for example, by a screw connection, via a receptacle not described in detail. In the process position, the sensor 16 has access to the medium 14 via an opening 8 at or near the bottom of the immersion tube 3. The opening 8 is configured such that it is open in a direction of flow of the medium 14, e.g., particularly when the retractable fitting 1 is employed in a pipe (e.g., the process container 15 is a pipe), i.e., the sensor 16 is optimally exposed to the flow of the measured medium 14.

The sensor 16 may be connected to a cable 19, as shown in FIG. 2. In certain embodiments, the cable 19 is connected to a transmitter, e.g., a conventional transmitter known in the field of analytical process technology (not shown).

The immersion tube 3 can be made of different materials. In the state of the art, immersion tubes 3 are made of steel or stainless steel. However, there are widespread applications, particularly in the chemical industry, in which highly chemical resistant materials are used. The immersion tube 3 can therefore also be made of a plastic such as polyether ether ketone (PEEK), polytetrafluoroethylene (PTFA), a perfluoroalkoxy polymer (PFA), another plastic, or a resistant metal such as Hastelloy. A ceramic can also be used. Another possibility is the use of one or more coatings of the aforementioned polymers. The same materials and/or coatings may be used for the housing 2.

The immersion tube 3 is axially displaceable (e.g., translatable, movable) in the direction of the medium 14, or in the direction away from the medium 14, along a central axis L. The immersion tube 3 can be moved between the service position, when retracted into the housing 2 (as shown in FIG. 2), and the process position, when extended from the housing 2 (shown in FIG. 1). The measurement of the medium 14 is performed in the process position, in which the sensor 16 has access to the medium 14 via the, e.g., cage-like, opening 8 in the immersion tube 3. Various service tasks such as cleaning and calibration, e.g., both including rinsing, are enabled and performed in the service position. Rinsing, cleaning, calibration, and/or sterilization medium can be conveyed into the service chamber 11 through a connection 7 (e.g., inlet). The rinsing, cleaning, calibration, and/or sterilization medium may be liquid or gaseous. The liquid can drain out again through a corresponding connection 22 (e.g., outlet), which can be disposed both axially and radially offset from connection 7. The flushing direction can also be reversed, e.g., from the connection 22 to the connection 7.

The immersion tube 3 is translated by a drive unit 18, which is disposed above the service chamber 11. The drive unit 18 may be part of the housing 2. The housing 2 defines a housing interior 12. Translation of the immersion tube 3 is conducted, for example, by automatic drive, such as by supply energy. If supply energy is introduced through the connection 4, the immersion tube 3 translates from the service position to the process position. In such an operation, the connection 5 then serves as an outlet. If supply energy is introduced through connection 5, the immersion tube 3 translates from the process position to the service position, in which operation the connection 4 then serves as an outlet. Pneumatic, hydraulic, or electric actuators, for example, are known from the state of the art. The retractable fitting 1 illustrated is configured for a pneumatic actuator. In alternative embodiments, manual operation is also possible. The process of translating the immersion tube 3 using a pneumatic drive is explained in greater detail herein.

In embodiments of the retractable fitting 1 configured for pneumatic drive, a piston is permanently connected to the immersion tube 3 or forms an integral part of it. The piston may be configured as an annular piston and is part of the drive unit 18. The piston divides the drive section of the housing interior 12 into an upper area and a lower area. The immersion tube 3 can be moved via the connection 4 in the upper area and the connection 5 in the lower area above or below the piston. For example, if compressed air is conveyed into the upper area through the connection 4, the immersion tube 3 moves in the direction of the medium 14, with air simultaneously flowing from the lower area through the connection 5. Air can also be actively sucked out of the lower area to facilitate the movement in the direction of medium 14. If compressed air is conveyed into the lower area through connection 5, the immersion tube 3 moves away from the medium 14, with air from the upper area flowing through connection 4 at the same time. Air can also be actively sucked out of the upper area to facilitate the movement.

Appropriate seals (not shown must be used to ensure that compressed air does not escape and is only fed and discharged through the connections 4, 5.

The connections 4, 5 are attached to the side of the housing 2. Connection 4 can be disposed above the piston (immersion tube 3 in service position), and connection 5 can be disposed below the piston (immersion tube 3 in process position). In certain embodiments, both connections 4, 5 on the housing 2 are disposed either above or below the piston and a line inside the housing 2 is routed to the other area to enable the described proper function of the drive unit 18. FIG. 1 shows the connections 4, 5 arranged next to each other above the piston (service position). FIG. 2 shows the connections 4, 5 arranged one above the other. As described, inside the housing 2 there is a corresponding line to guide connection 5 into the lower area of the housing interior 12. The connections 4, 5 do not necessarily have to be in the same frontal plane.

The service chamber 11 is disposed in the interior 12 of the housing 2 and is defined by the wall 2a. In the exemplary embodiment of FIG. 2, the service chamber 11 is disposed directly above the connection means 13. As shown, the service chamber 11 has an inlet at connection 7 and an outlet at connection 22.

When the immersion tube 3 is in the service position, a portion of the immersion tube 3, in particular the sensor 16, is disposed in the service chamber 11 for rinsing, cleaning, calibration, sterilization, etc. The sealing element 9 is located at the lower end of the immersion tube 3 to enable sealing off the process. The sealing element 9 seals off the service chamber 11 from the process and, therefore, from the measuring medium 14. The measuring medium 14 may be hot, toxic, corrosive, carcinogenic or otherwise harmful to humans and the environment. Combinations of such exemplary medium properties are also often present in chemical plants. Thus, housing wall 2a and sealing element 9 are complementary to ensure that the sealing element 9 seals securely and reliably. One or more of various sealing devices may be fitted to the housing 2 for this purpose, for example, one or more medium seals 10 may be used. In the illustrated embodiment of FIG. 2, the medium seal 10 is arranged on the housing 2. Alternatively, the medium seal 10 can be arranged at the lower end area of the immersion tube 3 (not shown).

At least one seal 17, e.g., in the exemplary embodiment two seals 17, 23, is arranged on the upper area of the immersion tube 3. The at least one seal 17, 23 is configured to seal the service chamber 11 from the drive unit 18, particularly when moving from the service position to the process position and vice versa. In the service position, the upper seal 17 is arranged above the connection 22, and the lower seal 23 is arranged at the same height or below the connection 22.

As shown in FIG. 1, an opening 6 may be disposed in the housing wall 2a in the vicinity of, e.g., adjacent, the service chamber 11. The opening 6 is not visible in FIG. 2 because it is arranged at an offset of 90° to the two connections 7, 22, for example. Other configurations are possible. In the embodiment shown in the cross-section of FIG. 3, the connections 7, 22 are not visible, only the opening 6.

The measuring system 100 comprises a calibration unit 120, which is movably (e.g., operable to translate) mounted in the opening 6, as indicated by the horizontal double arrow in FIG. 3. The calibration unit 120 is translatable between a rest position and a calibration position. In the rest position, the calibration unit 20 is essentially arranged outside the service chamber 11. In its calibration position, on the other hand, calibration unit 20 is in optical contact with optical sensor 16, e.g., at least partially inside the service chamber 11, and thus inside the housing wall 2a when the retractable fitting 1 is in its service position.

In the process position of the retractable fitting 1, the calibration unit 20 cannot be moved into its calibration position. Similarly, the retractable fitting 1 cannot be moved into the process position when the calibration unit 20 is in the calibration position.

The calibration unit 20 comprises at least one light source 26 configured and operable to emit light in the direction of the optical sensor 16 in the calibration position. The calibration unit 20 may also comprise at least one reference material 24, by which the optical sensor 16 is calibrated. The calibration unit 20 thus comprises the light source 26 or the reference material 24 or both. Care must always be taken to ensure that the service chamber 11 is sealed off from the environment. In certain embodiments, the calibration unit 20 includes more than one light source 26 or more than one calibration material 24 or a combination thereof. In at least one embodiment, the calibration unit 20 comprises a combination of reference materials 24 and light sources 16 that are required for calibration and, if necessary, adjustment and verification, of the optical sensor 16. The various elements can then be controlled accordingly and are directed toward the desired operation with the optical sensor 16.

The calibration unit 20 is translated into and out of the interior of the retractable fitting 1, more precisely into the service chamber 11, via the opening 6. The mechanical configuration of the calibration unit 20 and the opening 6 (e.g., dimensions, sealing surfaces and elements, stops and seating surfaces, etc.) ensures process integrity throughout the calibration procedure.

The connections 7, 22, which are used for the supply of rinsing, cleaning and calibration fluids, are used to flush the service chamber 11, as described herein. Thus, it is possible to clean the sensor 16 or the service chamber 11. For this purpose, the measuring system 100 comprises a system that supplies the required fluids to the connections 7, 22 at the desired time. Such operations and functions may be controlled, e.g., in an automated manner, via a data processing unit 110, which may include a processor and memory, such as a programmable logic control (PLC) and/or a distributed control system (DCS).

At least one seal 25, e.g., an O-ring, is disposed at the opening 6. The seal 25 seals the service chamber 11 from the drive unit 18, particularly during movement from the service position to the process position and vice versa. Furthermore, the seal 25 seals the service chamber 11 from the environment surrounding the measuring system 100, in particular when the calibration unit 20 moves from the rest position to the calibration position and vice versa.

As mentioned, the measuring system 100 comprises a data processing unit 110 which controls the movement of the immersion tube 3 and the movement of the calibration unit 20 as well as the calibration procedure. Connecting lines from the data processing unit 110 to the sensor 16 and the calibration unit 20 are shown symbolically in FIG. 3. The data processing unit 110 can also take over the data processing of the sensor 16, or at least forward the measurement data.

While various embodiments of a measuring system and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. The present disclosure is not intended to be exhaustive or to limit the scope of the subject matter of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible and thus remain within the scope of the present disclosure.

The invention claimed is:

1. An immersion, flow, or add-on measuring system for analytical process technology, the measuring system comprising:
    an optical sensor configured to measure at least one variable of a medium in a process vessel;
    a retractable fitting configured to mount the optical sensor, the retractable fitting comprising:
        a substantially hollow cylindrical housing having a housing wall which defines an interior region of the housing;
        a service chamber within the interior region; and an immersion tube configured to be axially translated within the housing between a service position, in which the immersion tube is withdrawn from the medium in the process vessel, and a process position, in which the immersion tube is introduced into the medium, wherein, in the service position, the immersion tube is disposed at least partially in the service chamber, wherein the optical sensor is disposed in the immersion tube, and wherein the housing wall includes an opening in a vicinity of the service chamber; and a calibration unit movably mounted in the opening and configured to be translated between a rest position and a calibration position, wherein, in the rest position, the calibration unit is arranged outside the service chamber, and wherein, in the calibration position, the calibration unit is in optical contact with the optical sensor with the retractable fitting positioned in the service position.

2. The measuring system according to claim 1, wherein, in the calibration position, the calibration unit is arranged at least partially within the service chamber with the retractable fitting positioned in the service position.

3. The measuring system according to claim 1, wherein the retractable fitting comprises one or more seals at or near the opening, which are configured to seal to the service chamber from an environment surrounding the measuring system.

4. The measuring system according to claim 1, wherein the retractable fitting is configured to prevent the calibration unit from being translated into the calibration position when the retractable fitting is in the process position.

5. The measuring system according to claim 1, wherein the retractable fitting is configured to prevent the retractable fitting from being translated into the process position when the calibration unit is in the calibration position.

6. The measuring system according to claim 1, wherein the calibration unit comprises at least one light source configured to emit light in a direction of the optical sensor in the calibration position.

7. The measuring system according to claim 1, wherein the calibration unit comprises at least one reference material by which the optical sensor is calibrated and/or verified.

8. The measuring system according to claim 1, wherein the retractable fitting comprises at least one flushing connection to the service chamber.

9. The measuring system according to claim 8, wherein the at least one flushing connection includes two flushing connections.

10. The measuring system according to claim 1, wherein the optical sensor is configured as a spectroscopic sensor.

11. The measuring system according to claim 10, wherein the spectroscopic sensor is a Raman spectroscopic sensor.

12. The measuring system according to claim 1, further comprising a data processing unit configured to control the translation of the immersion tube between the process position and the service position, the translation of the calibration unit between the rest position and the calibration position, and a calibration procedure of the optical sensor using the calibration unit.

* * * * *